(12) United States Patent
Brodin

(10) Patent No.: US 6,371,282 B1
(45) Date of Patent: Apr. 16, 2002

(54) CAM CONTROLLED CONVEYOR

(76) Inventor: Kenneth Brodin, Kanotägen 19, 293 39 Olofström (SE)

(*) Notice: Subject to any disclaimer, the term of this patent is extended or adjusted under 35 U.S.C. 154(b) by 37 days.

(21) Appl. No.: 09/659,073

(22) Filed: Sep. 11, 2000

Related U.S. Application Data

(63) Continuation of application No. PCT/SE99/00204, filed on Feb. 17, 1999.

(30) Foreign Application Priority Data

Mar. 10, 1998 (SE) .............................................. 9800760

(51) Int. Cl.$^7$ ........................... B65G 27/12; B65G 49/00
(52) U.S. Cl. .................................. 198/750.1; 198/750.8
(58) Field of Search ........................... 198/750.1, 750.8

(56) References Cited

U.S. PATENT DOCUMENTS 2,676,690 A * 4/1954 Kottmann ..................... 199/23
6,209,713 B1 * 4/2001 Takahashi et al. ........ 198/750.8
6,318,541 B1 * 11/2001 Takahashi et al. ........ 198/750.1

FOREIGN PATENT DOCUMENTS

| CH | 571 991 | | 1/1976 | |
|---|---|---|---|---|
| EP | 0 077 753 | * | 4/1983 | ........... B65B/35/34 |
| FR | 2 379 484 | * | 1/1978 | ........... B65G/27/12 |
| FR | 2 379 454 | | 9/1978 | |

* cited by examiner

*Primary Examiner*—Christopher P. Ellis
*Assistant Examiner*—Kenneth W. Bower
(74) *Attorney, Agent, or Firm*—Browdy and Neimark, P.L.L.C.

(57) ABSTRACT

A vibrating conveyor has a conveying plate (6) which carries objects to be conveyed. The conveying plate (6) is movable back and forth between a first and a second end position by a cam wheel (7) and a pressure spring (8). The cam wheel (7) has on its periphery at least one cam (18) with a cam surface (19) which has a distance to the center of the cam wheel (7) that increases continuously in the direction opposite to the direction of rotation of the cam wheel (7), and which is terminated abruptly with a substantially radially directed cam surface portion. The pressure spring (8) is arranged to be contracted during the displacement of the conveying plate (6) to the first end position, and then displaces the conveying element to the second end position. The conveying plate (6) has a cam follower (21), which abuts against the periphery of the cam wheel (7) to follow the cam surface of the cam as the cam wheel rotates and move the conveying element (6) to the first end position against the action of the pressure spring (8). The conveying plate (6) is moved so fast from the first end position to the second end position that the objects are not carried along, and so slowly in the opposite direction that the objects are carried along.

3 Claims, 2 Drawing Sheets

CAM CONTROLLED CONVEYOR

CROSS REFERENCE TO RELATED APPLICATION

Figure 1:
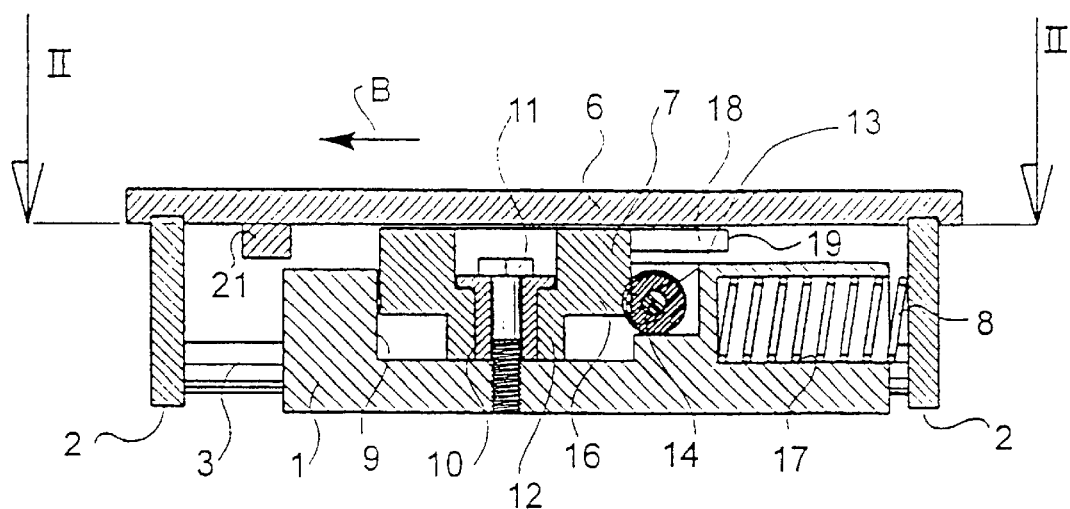

The present application is a continuation of PCT/SE99/00204, filed Feb. 17, 1999.

The present invention relates to a vibrating conveyor which has a frame, a conveying element which is arranged to carry objects to be conveyed and is mounted on the frame to be moved back and forth between a first end position and a second end position, and a drive means arranged in the frame to move the conveying element back and forth, the drive means being arranged to move the conveying element relatively slowly to the first end position, and to move it relatively fast to the second end position, thereby bringing about a displacement of the objects in a direction corresponding to the moving direction of the conveying element from the second end position to the first end position.

In the engineering industry there are often problems in moving objects from a working position to a take-up position, or to another working position if the space is limited. It is thus difficult, if not impossible, to install an effective roller or belt conveyor in connection with eccentric presses or the like and, therefore, the objects often have to be moved manually. Experiments have been made with vibrating conveyors which, however, have the disadvantage of suddenly changing conveying direction, which means that the objects can be returned to the working position and thus cause damage. Besides, vibrating conveyors operate at a very high noise level.

These problems have been eliminated using a vibrating conveyor of the type described by way of introduction and known from Swedish patent specification 7702895-9 (Publication No. 414,160). In this known vibrating conveyor, the drive means comprises a pneumatic piston and cylinder assembly and a relatively complicated arrangement of springs and valves in order to have this known vibrating conveyor operate in a satisfactory way, it is required that the drive means contain lubricating oil for the parts that are movable in relation to each other. The compressed air used for driving causes oil in this known vibrating conveyor to be ejected from the interior of the conveyor and to contaminate the conveyor as well as the surroundings.

The object of the present invention is thus to provide a vibrating conveyor, in which this disadvantage is eliminated and which moreover has a considerably simpler structure than the known vibrating conveyor.

According to the invention, this object is achieved by a vibrating conveyor which is of the type stated by way of introduction and is characterised in that the drive means has a cam wheel which is rotatably arranged in the frame and which on its periphery has at least one cam with a cam surface which has a distance to the centre of the cam wheel that increases continuously in the direction opposite to the direction of rotation or the cam wheel, and which is terminated abruptly with a substantially radially directed cam surface portion, that the drive means further has a spring member arranged in such manner between the frame and the conveying element that it is tensioned during the movement of the conveying element to the first end position, and then moves the conveying element from the first end position to the second end position, and that the conveying element has a cam following means connected thereto, which abuts against the periphery of the cam wheel to follow the cam surface of the cam or cams as the cam wheel rotates and move the conveying element to the first end position against the action of the spring member.

Preferably, the cam wheel has four identical cams uniformly distributed along the periphery or the cam wheel.

In a preferred embodiment each cam surface has a distance to the centre of the cam wheel which first increases slowly and then faster and faster to give the conveying element a gradually increasing acceleration when moving from the second end position to the first end position.

Figure 2:
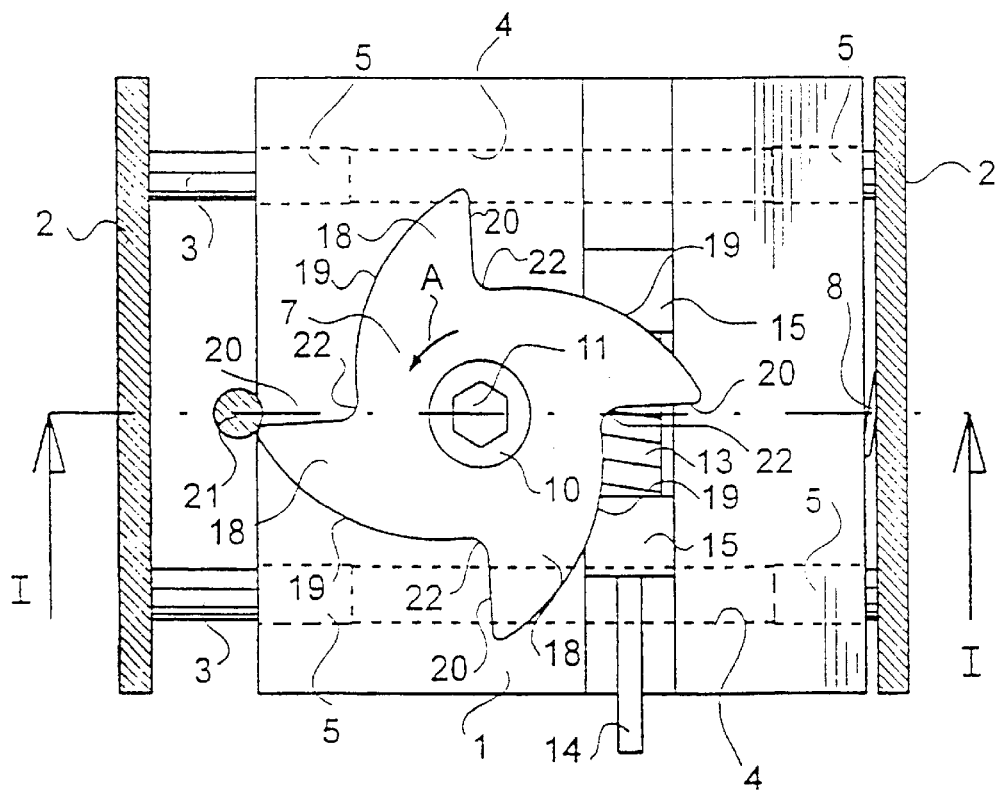
Figure 3:
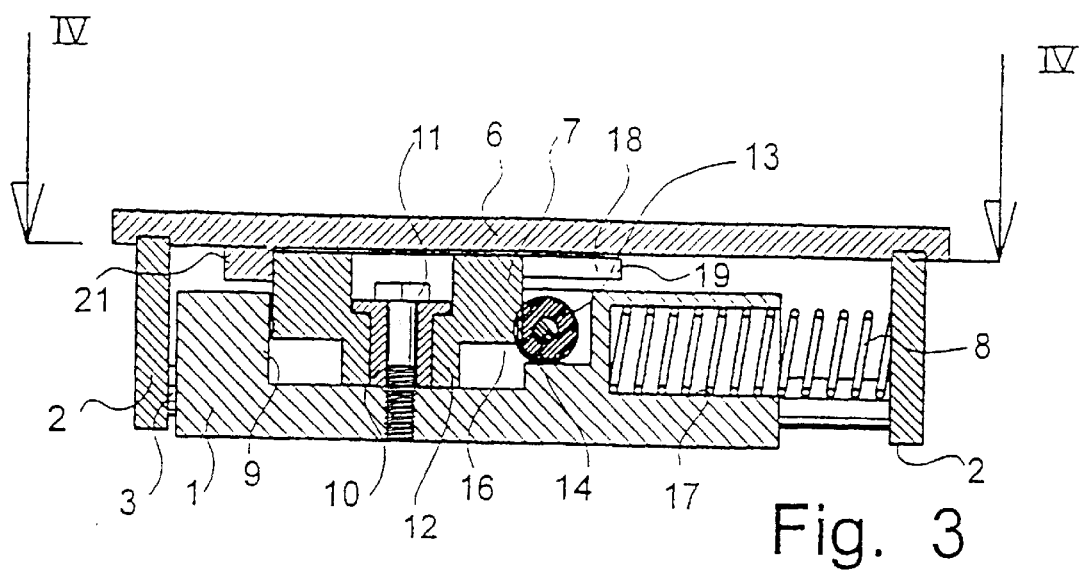
Figure 4:
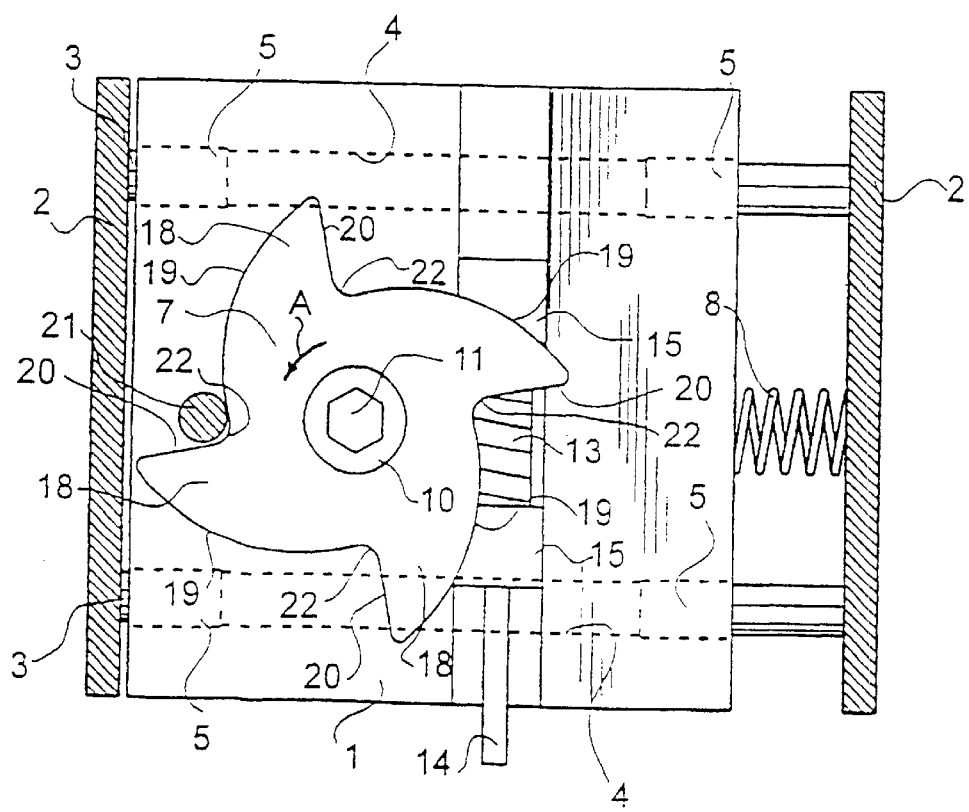

The invention will now be described in more detail by way of an example and with reference to the accompanying drawings, in which:

FIG. 1 is a sectional view of an embodiment of a vibrating conveyor according to the invention along the line I—I of FIG. 2, in which a conveying plate is shown in a first end position, FIG. 2 is a sectional view of the vibrating conveyor along the line II—II of FIG. 1, FIG. 3 corresponds to FIG. 1 but shows the conveying plate in a second end position, and FIG. 4 is a sectional view of the vibrating conveyor along the line IV—IV of FIG. 3.

The embodiment of a vibrating conveyor according to the invention shown in the drawings has a frame 1, which substantially has the shape of a square, relatively thick metal plate which is horizontally arranged, and which is to be secured to, for instance, some sort of working machine. The frame 1 carries two supporting beams 2 which are arranged on either side thereof and connected to each other by two parallel guide rods 3, each of which extends through a separate horizontal bore 4 in the frame 1. The guide rods 3 are slidably arranged in slide bearings 5, which are placed in the openings of the bores 4.

The supporting beams 2 support in their turn a horizontal conveying plate 6 which is fixedly connected thereto and positioned above the frame 1 and on which objects (not shown), which are to be moved by the vibrating conveyor, are placed either directly on the plate 6, or on a conveyor chute or the like arranged thereon.

The conveying plate 6 is movable back and forth by a drive means 7, 8 comprising a cam wheel 7 and a pressure spring 8. The conveying plate 6 is movable between a front first end position (FIG. 1) and a rear second end position (FIG. 3).

The frame 1 has in its end face facing the conveying plate 6 a recess 9 to the bottom of which a pivot 10 is secured by a screw 11. The cam wheel 7 is positioned between the frame 1 and the conveying plate 6 and has a hub 12 by means of which it is rotatably arranged on the pivot 10. In the direction of rotation indicated in FIGS. 2 and 4 by an arrow A, the cam wheel 7 is driven by a worm 13, the shaft 14 of which is rotatably mounted in the frame 1 by means of two bearings 15. The worm 13 meshes with a gear wheel 16 with oblique teeth, which is arranged on the hub 12.

The frame 1 has in its rear edge side a recess 17, in which the pressure spring 8 is placed. The pressure spring 8 is clamped between the frame 1, here in the form of the bottom of the recess 17, and the rear supporting beam 2.

The cam wheel 7 has four identical cams 18 uniformly distributed along the periphery of the cam wheel. Each cam 18 has a cam surface 19 having a distance to the centre of the cam wheel 7 that increases continuously in the direction opposite to the direction of rotation A of the cam wheel 7, and is terminated abruptly with a substantially radially directed cam surface portion 20. The distance of the cam surface 19 to the centre of the cam wheel 7 at first increases slowly and then faster and faster.

The conveying plate 6 has a cam follower connected thereto in the form of a pin 21 of circular cross-section protruding in the direction of the frame 1. The pin 21 is pressed against the periphery of the cam wheel 7 by the pressure spring 8 to follow the cam surface 19 of the respective cams 18 as the cam wheel rotates, and against the action of the pressure spring 8 move the conveying plate 6 to its front first end position (FIG. 1). During this forwards moving of the conveying plate 6, the pressure spring 8 is further contracted. As a consequence of the design of the cam surface 19, the conveying plate 6 is first moved slowly and is then given a gradually increasing acceleration. When the pin 21 reaches the radially directed cam surface portion 20 (FIG. 2), it is very quickly moved by the pressure spring 8 in the direction of the centre of the cam wheel 7 to abut against a transition portion 22 (FIG. 4) between the cam surface portion 20 on the cam 18 which the pin 21 thus leaves, and the cam surface 19 on the next cam 18. The transition portion 22 has a rounded shape with a radius of curvature substantially equivalent to the radius of the pin 21. As the pin 21 passes from one cam 18 to the next cam 18, the conveying plate 6 is thus moved very quickly from its front first end position to its rear second end position.

During the slowly starting forwards moving of the conveying plate 6, the objects placed on the conveying plate are carried along, while they are not carried along during the very quick backwards moving of the conveying plate 6. In this way, the objects will thus be intermittently moved forwards, i.e. in the moving direction indicated by an arrow B in the FIGS. 1 and 3.

What is claimed is:

1. A vibrating conveyor which has a frame (1), a conveying element (6) which is arranged to carry objects to be conveyed and is mounted on the frame (1) to be moved back and forth between a first end position and a second end position, and a drive means (7, 8) arranged in the frame (1) to move the conveying element (6) back and forth, the drive means (7, 8) being arranged to move the conveying element (6) relatively slowly to the first end position, and to move it relatively fast to the second end position, thereby bringing about a displacement of the objects in a direction (B) corresponding to the moving direction of the conveying element from the second end position to the first end position, characterised in that the drive means (7, 8) has a cam wheel (7) which is rotatably arranged in the frame (1) and which on its periphery has at least one cam (18) with a cam surface (19) which has a distance to the centre of the cam wheel (7) that increases continuously in the direction opposite to the direction of rotation (A) of the cam wheel, and which is terminated abruptly with a substantially radially directed cam surface portion (20), that the drive means (7, 8) further has a spring member (8) arranged in such manner between the frame (1) and the conveying element (6) that it is tensioned during the movement of the conveying element (6) to the first end position, and then moves the conveying element (6) from the first end position to the second end position, and that the conveying element (6) has a cam following means (21) connected thereto, which abuts against the periphery the cam wheel (7) to follow the cam surface (19) of the cam or cams (18) as the cam wheel rotates and move the conveying element (6) to the first end position against the action of the spring member (8).

2. A vibrating conveyor as claimed in claim 1, characterised in that the cam wheel (7) has four identical cams (18) uniformly distributed along the periphery of the cam wheel.

3. A vibrating conveyor as claimed in claim 1, characterised in that each cam surface (19) has a distance to the centre of the cam wheel (7) which first increases slowly and then faster and faster to give the conveying element (6) a gradually increasing acceleration when moving from the second end position to the first end position.

* * * * *